July 10, 1951  R. H. MILLER  2,560,237
SPHYGMOMANOMETER
Filed Dec. 11, 1948  3 Sheets-Sheet 3
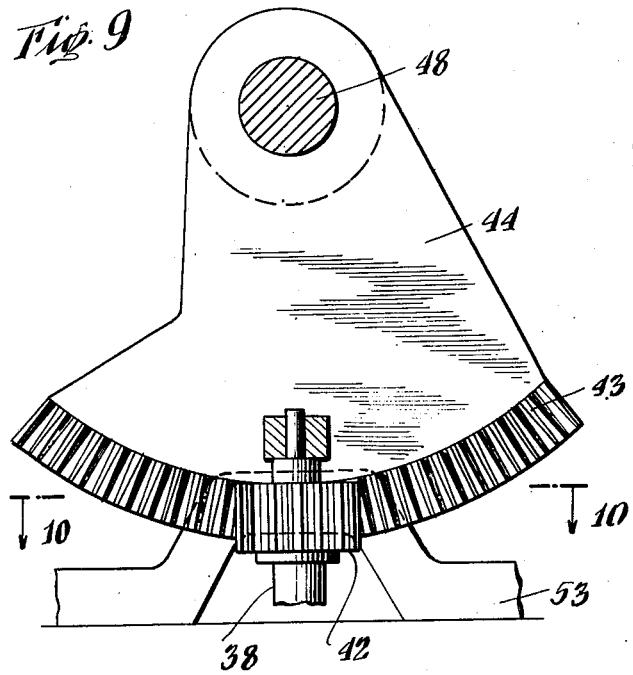
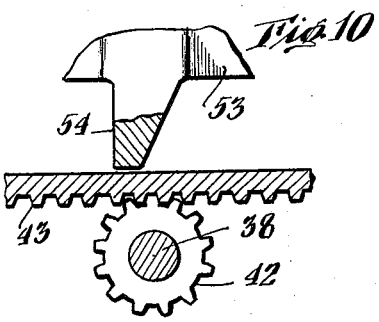
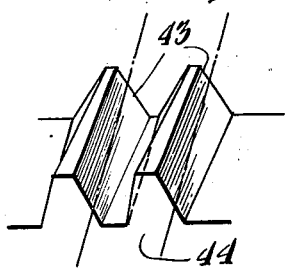
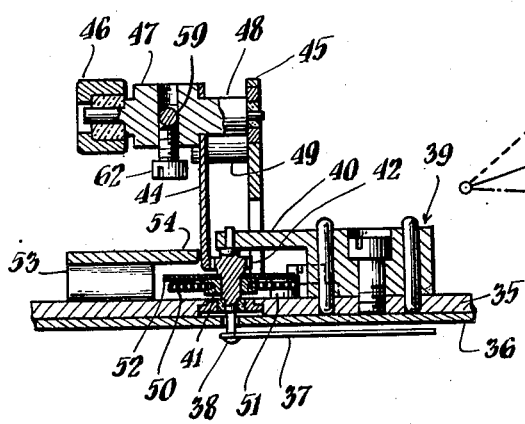
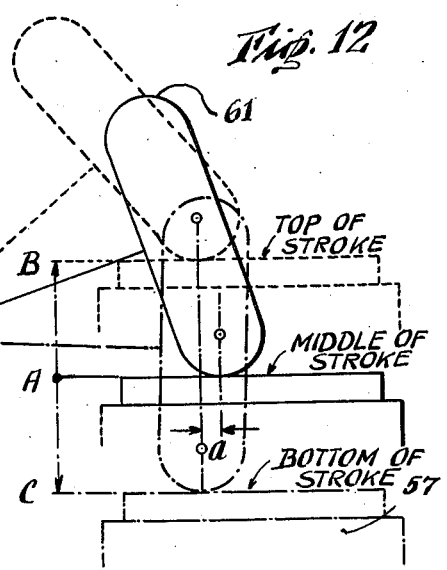
INVENTOR.
Raymond H. Miller
BY Duell and Kane
ATTORNEYS Patented July 10, 1951

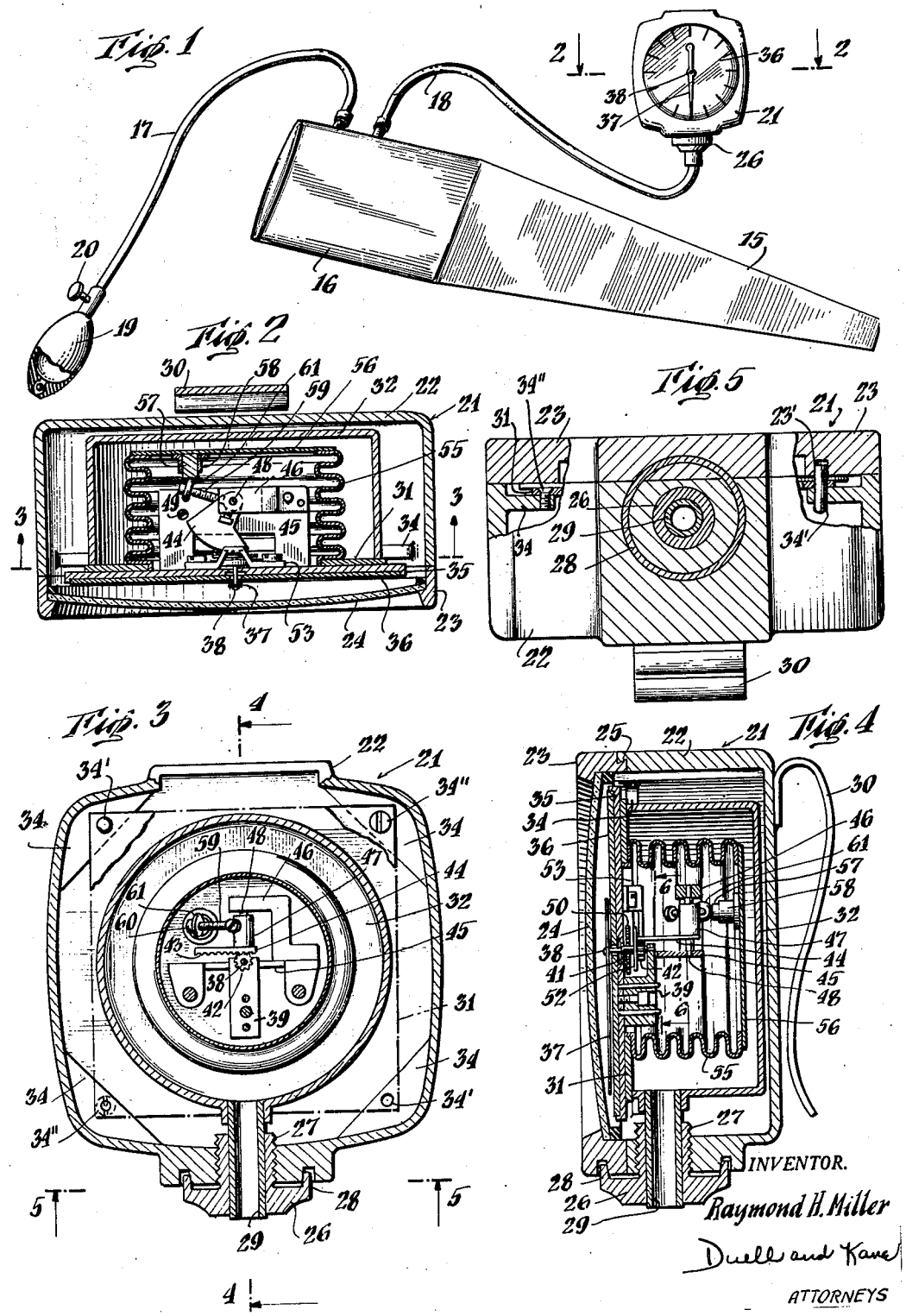

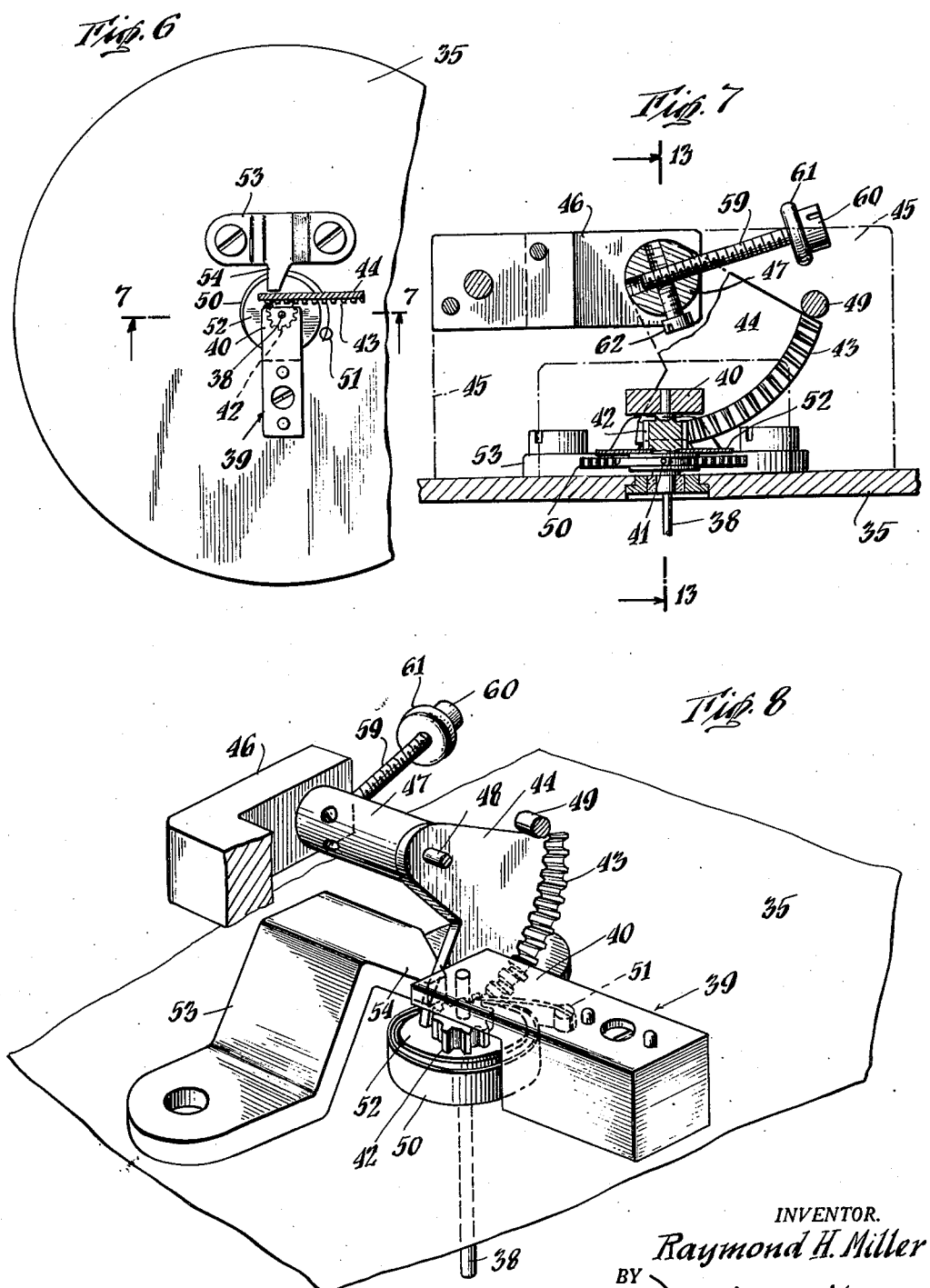

2,560,237

UNITED STATES PATENT OFFICE 2,560,237

SPHYGMOMANOMETER

Raymond H. Miller, Riverside, R. I., assignor to Federal Products Corporation, Providence, R. I., a corporation of Rhode Island Application December 11, 1948, Serial No. 64,760

17 Claims. (Cl. 128—2.05)

This invention relates to a structurally and functionally improved sphygmomanometer and aims to provide an instrument of this type which will be extremely sensitive in response so that completely reliable and accurate readings may be obtained.

A further object is that of providing an instrument of this type, which despite the delicacy of its response, will embrace a relatively rugged assembly capable of being subjected to all normal use and abuse without damage to the parts or the liability of such parts being shifted out of adjustment.

Another object is that of furnishing an improved sphygmomanometer of the aneroid type which may be operatively coupled with a cuff employing air pressure which cuff may be of conventional construction; the apparatus accordingly lending itself to use with conventional medical technique so that no difficulties will be experienced in this connection.

Still another object is that of furnishing an assembly including relatively few parts, each individually simple in design such parts being capable of relatively ready assemblage and when so assembled, operating over long periods of time with freedom from all difficulties.

With these and other objects in mind, reference is had to the attached sheet of drawings illustrating one practical embodiment of the invention and in which:

Fig. 1 is a front view of a sphygmomanometer assembly;

Fig. 2 is an enlarged sectional side view of the unit forming the subject matter of the present invention, such view being taken along the lines 2—2 and in the direction of the arrows as indicated in Fig. 1;

Fig. 3 is a sectional front view taken along the lines 3—3 and in the direction of the arrows as indicated in Fig. 2;

Figs. 4 and 5 are sectional views taken respectively along the lines 4—4 and 5—5 in the direction of the arrows as indicated in Fig. 3; certain parts having been broken away in the latter figure to disclose underlying structures;

Fig. 6 is a rear elevation of certain of the mechanism as shown in Fig. 4 and taken along the lines 6—6 and in the direction of the arrows as indicated in that figure;

Fig. 7 is an enlarged sectional view taken along the lines 7—7 and in the direction of the arrows as indicated in Fig. 6;

Fig. 8 is a perspective view of the elements of the assembly as shown especially in Fig. 7;

Fig. 9 is a face view of one of said elements in substantially enlarged scale;

Fig. 10 is a sectional plan view taken along the lines 10—10 and in the direction of the arrows as indicated in Fig. 9;

Fig. 11 is a fragmentary perspective view of certain of the teeth or gear segments as shown in the preceding views;

Fig. 12 is a somewhat diagrammatic view illustrating of the lever movements under varying conditions of operation; and Fig. 13 is a sectional view taken along the lines 13—13 of Fig. 7 and in the direction of the arrows shown in that view.

Referring primarily to Fig. 1, the numeral 15 indicates a unit commonly identified as a cuff of a sphygmomanometer assembly. This unit may be of any desired type and incorporate any preferred outline. Ordinarily, it will be formed of fabric or similar material and contain an inflatable bag 16 to which a tube 17 connected to a bulb or compressing element 19 is secured. This bulb is conventionally provided with a check valve and a control valve 20 may be additionally provided adjacent the outlet end of the bulb. A second tube 18 extends from the bag 16 and may be connected with the registering unit which forms the subject matter of the present application. This unit has been generally indicated by the reference numeral 21.

As shown especially in Figs. 2 to 5, of the drawings, it is preferred that this unit embrace an outer case comprising a rear section 22 and a front section 23. The latter is, in effect, a framing member for a transparent covering element 24 formed of suitable material. The adjacent upper edges of casing sections 22 and 23 may be undercut or dovetailed as indicated at 25 so that if these sections are mated and an upward pressure is exerted, a separating of the casing sections will be prevented. To retain the parts in such association, a member 26 is disposed adjacent the lower end of the casing section 22 and has a screw threaded stem 27 projecting into a correspondingly threaded bore of that casing. This member is also conveniently formed with an inwardly extending flange portion 28 which bears within grooves formed in the under faces of the casing sections 22 and 23, the member 26 rotatably encircling the tube 29 extending from the instrument and which tube is to be connected with tube 18.

Member 26 may have any desired outline or be knurled so as to be capable of being tightened or loosened. When it is in the position shown in Figs. 3, 4, and 5, it is apparent that it will bear against the under face of section 22 of the casing to maintain the surfaces 25 in contacting and firm engagement to thus prevent separation of these sections adjacent their upper ends. Due to the flange portion 28 entering the grooves of sections 22 and 23 the member 26 will also maintain the sections in intimate association adjacent their lower ends. As has been indicated, section 22 may mount a clip 30 by means of which the entire assembly may be conveniently supported.

The operating parts of the mechanism are associated with or disposed within an inner casing mounted within the outer casing just described. This inner casing may include a base 31 and body 32; the tube 29 communicating with the interior of the latter. The base as especially shown in Fig. 3, may be substantially square and is in permanent and air-tight association with the body 32. Casing section 22 may mount tangentially extending webs 34 which overlap the corners of the base 31. A pair of these webs may mount pins 34' which extend through openings in the corners of base 31 and into recesses 23' formed in the outer casing section 23. A second pair of webs may be formed with threaded openings into which the stems of screws 34" extend, the heads of these screws bearing against base 31 to secure the parts against displacement and with the exterior face of body portion 32 spaced from the inner face of casing section 22. Therefore, the inner casing and its contained mechanism are protected against damage to a maximum extent.

Secured to the base 31 in any desired manner such as, for example, by screws (not shown) is a plate 35. The latter may mount a dial 36 the face of which is suitably sub-divided to provide a scale of proper range. This dial is in turn secured to the plate in any desired manner and both of these elements may have any configuration such as circular. A pointer 37 is mounted upon a rotatable shaft 38 extending through the dial 36 and the plate 35 into the interior of the body 32. Thus, when shaft 38 is rotated, the pointer 37 will traverse the graduations appearing upon the face of the dial in order that proper readings may be effected.

The mechanism for securing rotation of shaft 38 has been especially shown in Figs. 6 to 11 inclusive and Fig. 13. As illustrated, a mounting block 39 may be secured to the rear face of plate 35 and have an extending portion 40 within which the inner end of shaft 38 rotatably bears. Between this extension and plate 35 the shaft may be formed with an integral hub 41 and pinion portion 42. The teeth of the latter mesh with an arcuate series of teeth 43, carried by a segmental gear 44. A plate 45 is mounted upon the inner surface of plate 35 to extend perpendicular with respect thereto. This plate is conveniently formed of somewhat resilient metal and straddles the mounting 39. Plate 45 supports a mounting 46 in spaced relationship with respect to its face. Between this mounting and plate, a hub 47 is disposed by being supported upon an integral shaft 48. Secured to this hub and shaft is the arcuate rack of gear member 44. A stop 49 may be provided to cooperate with the edge of member 44 and thus limit the movement of the latter in one direction.

It is contemplated that in lieu of forming plate 45 of somewhat resilient metal, that plate might be mounted in a manner such that its upper edge could be momentarily deflected. In the latter instance, the plate could, of course, also be formed of resilient metal should this be desired. Likewise, while as shown the shafts 38 and 48 are integral with their several hub and other portions, this also need not necessarily be the case. As is obvious, these parts might include any desired number of elements suitably assembled and fixed against movement with respect to each other.

To normally maintain the parts in a position at which the shaft 48 and hub 47 have moved to a maximum extent in a counterclockwise direction as viewed in Figs. 7 and 8, a spring is employed. This spring is of the "hair" type and has been indicated by the numeral 50. One end of the spring, is anchored against movement as indicated at 51 and its opposite end is secured to the hub 41. A confining plate 52 is suitably secured to the shaft 38 and its hub portion to overlie the spring 50. Accordingly the latter will be prevented from displacing in an upward direction. Thus, the spring in tending to expand, will normally maintain the parts as shown in Figs. 7 and 8.

In order to assure the accuracy of the registered result the teeth of the arcuate series 43 and the teeth of the pinion 42 may be so constructed as to minimize lost motion or friction. To this end as shown in Figs. 9 and 11, each tooth of series 43 is shaped and disposed so that before any tooth 43 completely disengages from a tooth of pinion 42, the surfaces of succeeding teeth will be engaged. In order to achieve this the teeth may be constructed in accordance with the teachings of United States Letters Patent to Street No. 2,141,627 dated December 27, 1938. Where so constructed or where these teeth otherwise involve inclined surfaces which tend to cam against each other under strain and shocks, the teeth of the different series tend to spring apart. To prevent this from occurring, a guide is employed. As shown especially in Figs. 6, 9, and 10, this guide may include a body 53 mounted on plate 35. From this part an abutment 54 extends towards the rear face of the arcuate rack or crown gear member 44. As shown especially in Fig. 10 the edge of this abutment or guide terminates at a point slightly spaced from the rear face of member 44. Consequently, a friction factor which would cause error is not introduced. However, when sufficient loading occurs and the teeth tend to separate, member 44 engages with its rear surface against abutment 54. As a consequence, a dampening effect results. Member 44 is mounted upon the shaft 48 adjacent its hub 47. This shaft is, in turn, supported between plate 45 and bracket 46. This plate is so constructed and/or mounted that when the parts are subjected to sudden strains or shock, the plate deflects slightly. This has a cushioning effect such that damage to the indicating mechanism is avoided. As will be apparent the guide and abutment 54 as aforedescribed will act to prevent a separation of the teeth of the crown gear and pinion even although the plate is deflected.

Now with a view to providing an operating mechanism such that shaft 48 and hub 47 will be oscillated, an assembly is employed which has been best illustrated in Figs. 2, 3, and 4. In those views it will be noted that the body of a bellows has been indicated at 55 and which has an end portion 56. The outer end of the bellows is mounted upon base 31 by having the parts adjacent its free edge connected in air tight relationship with the adjacent surfaces of that base. Such a connection may be established in any desired manner. The bellows is preferably constructed of metal and incorporates resilient characteristics such that it will normally maintain a predetermined position within the body of casing 32. Its interior communicates with the atmosphere, for example through the opening which accommodates shaft 38. A contact pad or element 57 of hard material such as metal is employed and is mounted conveniently within a socket fixed to the inner face of the bellows end 56. Therefore, this element will travel back and forth with that part as the bellows is subjected to varying degrees of air pressure.

As shown especially in Figs. 7, 8 and 13 hub 47 is preferably formed with intersecting screw-threaded bores. Into one of these the threaded stem 59 of a screw is disposed. This screw is conveniently formed with a head 60 slotted to receive the end of a screw driver or similar instrument so that the screw may be projected or retracted to a greater or lesser extent with respect to the hub 47. As illustrated in the several views the screw is projected beyond a position which it will normally occupy. In actual practice it may be retracted to a point where the outer end of stem 59 actually projects to a material extent through and beyond the hub. Such projection should, of course, in no event, be sufficiently great that the outer stem end contacts the mounting 46. To secure the screw or arm 59 in its adjusted position, a lock screw 62 may be employed.

To assure maximum accuracy of response that surface of the arm or screw 59 which cooperates with the contact pad 57 should be of reduced area. However, it is preferred that in order to minimize the danger of damage to the parts, this surface should not be a "knife-edge." Rather, in accordance with the present teachings, the surface may be curved to extend through a rather small radius. To this end, as shown in the drawings, a flange 61 is provided which preferably forms an integral part of the arm or screw. The edge of this flange presents an accurate radius extending around the entire periphery of the flange. With this surface in engagement with the surface of the contact pad it is obvious that a desirable form of driving engagement is furnished as will be particularly hereinafter apparent. As will also be understood, the surface 61 might be extended to provide a complete sphere. However, again it is preferred in most instances, to employ substantially the configuration which has been illustrated. Since the contact lever is constructed as a screw, and since its contacting surface 61 is symmetrical about its axis, infinite adjustment of the lever length is obtained throughout the range of the parts. Such adjustment of lever length obviously results in magnification or diminution of operative movement. It permits of compensation for variations of the strokes of the bellows.

In use it will be understood that the cuff 15 is applied to the arm or other limb portion of the patient in the usual manner and with the present unit connected therewith. Thereafter the bag 16 is inflated by actuating the bulb 19. This inflation is continued to the desired degree after which valve 20 may be closed. During this operation, air under pressure will flow through tube 18 to tube 29. Therefore, the space between the bellows 55 and casing 32 will not alone be filled with air under pressure but also, because of the patient's pulse reacting against bag 16, variations or pulsations of air pressure will be transmitted to this space from the cuff. The space between the bellows and casing being sealed against leakage, it follows that the greater the pressure, the more the bellows will be compressed. Such compressing will cause base 56 to move towards base 31. The variations or pulsations of pressure will, of course, have the result that plate 56 will reciprocate through a limited range. This will continue even though the pressure within the bag 16 is not increased by continued actuation of the bulb 19 or decreased by an opening of valve 20.

Incident to the contact existing between the surface 61 of the flange and the contact pad 57 it is apparent that as the latter moves towards the base 31 it will cause the hub 47 and shaft 48 to move in a clockwise direction as shown in Figs. 7 and 8. Such movement will also be transmitted to the crown gear member and through the teeth 43 of the latter to the pinion 42. Therefore, shaft 38 will be rotated causing the pointer 37 to traverse the graduations of dial 36. As the bellows 55 expands, contact is maintained between the surface of pad 57 and the flange 61 incident to the provision of the spring 50 which is constantly urging the pinion 42 to shift to a position at which pointer 37 will be adjacent the zero graduation of dial 36.

At this time it is well to analyze the motion of the contact lever or screw 59 with respect to the contact pad 57. For this purpose, attention is invited to Fig. 12. In that view, the contact pad has been indicated by the reference numeral 57 and the curved surface of the head portion of the lever has again been indicated by the numeral 61. This figure diagrammatically indicates the travel and cooperation of the parts irrespective of the effective lever length. The position indicated at A shows the station of the parts at what might be termed mid-stroke. The distance A to B indicates the travel between this midstroke position and top of the stroke. The distance A to C indicates the range between midstroke and the bottom of the stroke. The contact pad height may be theoretically thought of as being increased by an amount equal to the radius which defines the contact surface 61. As shown, that flange defines a circular edge. As is apparent, the theoretical plane of the contact pad surface passes through the center of the contact lever pivot (shaft 48) when the contact pad is at mid-stroke. Therefore, equal increments of motion of the contact pad above or below that point (i. e. movements perpendicular to the surface of the pad) will produce substantially equal increments of motion of the pointer above and below mid-point as it is driven or shifted by the contact lever screw.

In actual practice the surface of the contact pad is lowered by the amount of the radius defining the curved surface or edge 61. Consequently, a line through the lever pivots and center of this radius is perpendicular to the direction of motion of the contact pad when the latter is at mid-stroke. Obviously, the arrangement does not produce exactly equal increments of pointer movement for equal increments of contact pad movements. However, since the bellows to which the pad is attached also does not provide equal increments of travel for equal increments of increasing pressure, the combination of the bellows and the lever tend to balance out errors. Therefore, as an ultimate result, substantially equal increments of pointer travel occur for equal increments of pressure differences and the dial graduations may be substantially equally spaced.

As is well understood by those conversant with sphygmomanometers, they are frequently subjected to rough or careless handling. With an apparatus as herein described, such shocks would produce damped oscillation of the bellows. These tend to hammer the contact lever screw. Therefore, the blows result in shock loads to all parts of the mechanism. As previously brought out, the present structure takes into account the possibility of such handling of the instrument and provides a structure whereby the mating gear teeth are not forced apart to positions at which their tips are distorted, break, or come out of mesh. The guide or abutment 54 not alone prevents these teeth from springing apart but also introduces an increment of friction to restrain movements of the parts under these circumstances, even although no friction factor is present under normal operation.

The plate 45 and the mounting brackets supported thereby which carry the shaft 48 serve also to cushion any shock loads. As is obvious, the bellows, indicating mechanism, driving assembly, and inner casing 32 provide a complete operating unit. The outside casing defined by the sections 22 and 23 serves to protect the inner casing and its associated parts, as well as the pressure chamber defined by that inner casing. These casings being connected as heretofore described, a shock-protecting structure of maximum efficiency is provided. At the same time the parts of the outer casing may readily be separated so as to render the inner assemblies accessible when this is necessary for adjustment, or inspection of the parts; it being noted that as preferably constructed the outer casing does not mount screws, bolts or other unsightly parts for securing its sections against movement with respect to each other.

Thus, among others, the several objects of the invention as specifically aforenoted are achieved. Obviously numerous changes in construction and rearrangement of the parts might be resorted to without departing from the spirit of the invention as defined by the claims.

I claim:

1. In a sphygmomanometer, a casing, a bellows mounted by said casing and connectible with a unit to be associated with a patient to respond to pulsations of the latter by having at least one of its surfaces reciprocate, a graduated dial, a pointed traversing said dial, a rotatable shaft mounting said pointer, connecting means extending between said bellows and shaft to cause the latter to rotate in response to reciprocations of the former, a pivoted lever forming a part of said connecting means, means presenting an arcuate surface mounted by said lever and cooperable with said bellows to be shifted thereby and the lever pivot and center defining the arc of said surface being disposed in a line substantially perpendicular to the line of bellows movement, when said bellows occupies a position substantially midway of its extremes of movement, whereby movements of the pointer over the dial will have substantially equal increments for equal increments of increasing pressure, despite the fact that the bellows movements will not embrace equal increments of travel responsive to such increases in pressure.

2. In a sphygmomanometer, a casing, a bellows mounted by said casing, means providing communication with the space intervening said casing and bellows, said means being connectible with a unit to be associated with a patient, a registering mechanism including a rotatable shaft, a pinion for driving said shaft, an arcuate gear movably supported to have its teeth drive the teeth of said pinion, means for connecting said arcuate gear with said bellows to be oscillated thereby, an abutment disposed adjacent said arcuate gear and closely spaced from the surface of the same, the teeth of said gears presenting cooperating surfaces such that under shock loads said arcuate gear will shift to engage said abutment.

3. In a sphygmomanometer, a casing, a bellows mounted by said casing, means providing communication with the space intervening said casing and bellows, said means being connectible with a unit to be associated with a patient, a registering mechanism including a rotatable shaft, a pinion for driving said shaft, an arcuate gear movably supported to have its teeth drive the teeth of said pinion, means for connecting said arcuate gear with said bellows to be oscillated thereby, the teeth of said gears presenting cooperating faces such that under shock loads the teeth of the different gears will tend to move out of mesh and brake means rendered operative by said shifting to dampen the movements of said gears.

4. In a sphygmomanometer, a casing, a bellows mounted by said casing, means providing communication with the space intervening said casing and bellows, said means being connectible with a unit to be associated with a patient, a registering mechanism including a rotatable shaft, a pinion for driving said shaft, an arcuate gear movably supported to have its teeth drive the teeth of said pinion, means for connecting said arcuate gear with said bellows to be oscillated thereby, a plate connected to be supported by said casing, said arcuate gear being movably mounted by said plate and said plate—at least in line with said gear mounting—being shiftable to correspondingly shift the gear mounted thereby.

5. In a sphygmomanometer, a casing, a bellows mounted by said casing, means providing communication with the space intervening said casing and bellows, said means being connectible with a unit to be associated with a patient, a registering mechanism including a rotatable shaft, a pinion for driving said shaft, an arcuate gear movably supported to have its teeth drive the teeth of said pinion, a lever connected to said arcuate gear to rock the same, said lever providing means defining an accurate radius adjacent its end and said bellows providing a surface to engage said radius-surface to shift said lever.

6. In a sphygmomanometer, a casing, a bellows mounted by said casing, means providing communication with the space intervening said casing and bellows, said means being connectible with a unit to be associated with a patient, a registering mechanism including a rotatable shaft, a pinion for driving said shaft, an arcuate gear movably supported to have its teeth drive the teeth of said pinion, a pivotally mounted lever connected to said arcuate gear to rock the same, said lever providing means defining an accurate radius adjacent its end, said bellows providing a surface to engage said radius-surface to shift said lever and means whereby the distance between the point of pivoted mounting of said lever and the radius defining means may be increased or decreased.

7. In a sphygmomanometer, a casing, a bellows mounted by said casing, means providing communication with the space intervening said casing and bellows, said means being connectible with a unit to be associated with a patient, a registering mechanism including a rotatable shaft, a pinion for driving said shaft, an arcuate gear movably supported to have its teeth drive the teeth of said pinion, a lever connected with said arcuate gear to rock the same, means supported by said lever and presenting a rounded edge for engagement with a surface moved by said bellows, means providing a pivot common to said lever and arcuate gear and the parts being disposed so that a line through said pivot and the center of the rounded edge is substantially perpendicular with the direction of motion of the said surface carried by the bellows when the latter is at a point substantially midway between its extremes of travel.

8. In a sphygmomanometer, a casing, a base secured to said casing, a bellows mounted within said casing and connected to said base, a contact pad secured to said bellows to move with the same, a plate mounted by said base, a bracket supported by said plate and having a part spaced therefrom, a shaft rotatably mounted between said plate and the spaced portion of said bracket, a crown gear secured to move with said shaft, a pinion having its teeth enmeshed with teeth of said crown gear, a shaft secured to said pinion to rotate with the same, registering mechanism secured to said latter shaft and a lever connected to said first named shaft and moveable by said contact pad.

9. In a sphygmomanometer, a casing, a base secured to said casing, a bellows mounted within said casing and connected to said base, a contact pad secured to said bellows to move with the same, a plate mounted by said base, a bracket supported by said plate and having a part spaced therefrom, a shaft rotatably mounted between said plate and the spaced portion of said bracket, a crown gear secured to move with said shaft, a pinion having its teeth enmeshed with teeth of said crown gear, a shaft secured to said pinion to rotate with the same, registering mechanism secured to said latter shaft, a lever connected to said first named shaft and moveable by said contact pad, a spring connected to normally urge said pinion shaft in a direction such that said lever and contact pad are maintained in driving engagement and normally inoperative frictionbrake means disposed adjacent a surface of said crown gear.

10. In a sphygmomanometer, a base, a hollow body connected to said base to provide in conjunction therewith a pressure chamber to be connected to a unit responding to the pulsations of a patient, said base being formed with an opening, a bellows mounted by said base to encircle said opening and extending into said body to prevent communication between the chamber and opening, a plate connected to said base to extend across said opening, a shaft rotatably carried by said plate and passing through an opening in the same, mechanism supported by said plate and projecting into the space defined by said bellows to rotate said shaft and means connecting said bellows with said mechanism for operating the latter as said bellows moves.

11. In a sphygmomanometer, a base, a hollow body connected to said base to provide in conjunction therewith a pressure chamber to be connected to a unit responding to the pulsations of a patient, said base being formed with an opening, a bellows mounted by said base to encircle said opening and extending into said body to prevent communication between the chamber and opening, a plate connected to said base to extend across said opening, a shaft rotatably carried by said plate and passing through an opening in the same, a lever pivotally supported by said plate, mechanism coupling said lever with said shaft to rotate the latter as said lever is rocked, said lever and mechanism extending into the space defined by said bellows and means connecting the latter with said lever for rocking the same as said bellows moves.

12. In a sphygmomanometer, a base, a hollow body connected to said base to provide in conjunction therewith a pressure chamber to be connected to a unit responding to the pulsations of a patient, said base being formed with an opening, a bellows mounted by said base to encircle said opening and extending into said body to prevent communication between the chamber and opening, a plate connected to said base to extend across said opening, a shaft rotatably carried by said plate and passing through an opening in the same, a lever pivotally supported by said plate, mechanism also supported by said plate and connecting said lever and shaft to rotate the latter as the former is rocked, a contact portion forming a part of said lever, means whereby the distance between the points of pivotal mounting of said lever and said contact portion may be varied, said lever and mechanism extending into the space defined by said bellows and means whereby said contact portion is engaged and shifted as said bellows shifts.

13. In a sphygmomanometer, a base, a hollow body connected to said base to provide in conjunction therewith a pressure chamber to be connected to a unit responding to the pulsations of a patient, said base being formed with an opening, a bellows mounted by said base to encircle said opening and extending into said body to prevent communication between the chamber and opening, a plate connected to said base to extend across said opening, a shaft rotatably carried by said plate and passing through an opening in the same, a lever pivotally supported by said plate, mechanism also supported by said plate and connecting said lever and shaft to rotate the latter as the former is rocked, a contact portion forming a part of said lever, means whereby the distance between the points of pivotal mounting of said lever and said contact portion may be varied, said lever and mechanism extending into the space defined by said bellows, said bellows including a base portion, and said base portion being engageable with said contact portion to move the latter and said lever as said bellows moves.

14. In a sphygmomanometer, a base, a hollow body connected to said base to provide in conjunction therewith a pressure chamber to be connected to a unit responding to the pulsations of a patient, said base being formed with an opening, a bellows mounted by said base to encircle said opening and extending into said body to prevent communication between the chamber and opening, a plate connected to said base to extend across said opening, a shaft rotatably carried by said plate and passing through an opening in the same, a lever pivotally supported by said plate, a gear connected to said lever to move with the same, a pinion secured to said shaft and having its teeth in engagement with the teeth of said gear, said lever, gear and pinion extending into the space defined by said bellows and means whereby in response to movements of said bellows said lever will be rocked.

15. In a sphygmomanometer, a base, a hollow body connected to said base to provide in conjunction therewith a pressure chamber to be connected to a unit responding to the pulsations of a patient, said base being formed with an opening, a bellows mounted by said base to encircle said opening and extending into said body to prevent communication between the chamber and opening, a plate connected to said base to extend across said opening, a shaft rotatably carried by said plate and passing through an opening in the same, a lever pivotally supported by said plate, a gear connected to said lever to move with the same, a pinion secured to said shaft and having its teeth in engagement with the teeth of said gear, said lever, gear and pinion extending into the space defined by said bellows, means whereby in response to movements of said bellows said lever will be rocked and a spring connected with said shaft and tending normally to maintain the same in a pre-determined position.

16. In a sphygmomanometer, a base, a hollow body connected to said base to provide in conjunction therewith a pressure chamber to be connected to a unit responding to the pulsations of a patient, said base being formed with an opening, a bellows mounted by said base to encircle said opening and extending into said body to prevent communication between the chamber and opening, a plate connected to said base to extend across said opening, a shaft rotatably carried by said plate and passing through an opening in the same, a lever pivotally supported by said plate, a gear connected to said lever to move with the same, a pinion secured to said shaft and having its teeth in engagement with the teeth of said gear and the teeth of said gear and pinion cooperating whereby under strains they will tend to separate with consequent displacement of a part of said gear, means carried by said plate and normally spaced from said gear to be engaged by the latter under conditions of gear displacement to effect a braking action, said lever, gear and pinion extending into the space defined by said bellows and means whereby said lever will be rocked responsive to movements of said bellows.

17. In a sphygmonanometer, a mounting, a shaft rotatably supported thereby, a pressure registering element shiftable responsive to shaft rotation, a bellows movable in response to pressure differentials created by the pulsations of a patient, a mechanism connecting said bellows to said shaft to rotate the latter as said bellows moves, an enclosing casing surrounding said mounting and comprising a pair of sections, means associated with the latter for preventing a lateral separation thereof when thrust is exerted on one of the same in a certain direction, a pressure transmitting tube extending from said mounting through an opening in said casing, a movably supported member encircling said tube and engaging the one casing section for exerting thrust against the same in said certain direction and means forming a part of said member and cooperative with said casing sections whereby said member simultaneously with the creation of such thrust will prevent said sections from having separative swinging movements with respect to each other.

RAYMOND H. MILLER.

REFERENCES CITED

The following references are of record in the file of this patent:

UNITED STATES PATENTS

| Number | Name | Date |
|---|---|---|
| 576,180 | Woodworth | Feb. 2, 1897 |
| 1,089,122 | Faught et al. | Mar. 3, 1914 |
| 1,350,174 | Norwood et al. | Aug. 17, 1920 |
| 1,690,671 | Dressler | Nov. 16, 1928 |
| 1,729,289 | Ireland | Sept. 24, 1929 |
| 1,729,290 | Ireland | Sept. 24, 1929 |
| 1,729,291 | Ireland | Sept. 24, 1929 |
| 2,421,114 | Cameron | May 27, 1947 |

FOREIGN PATENTS

| Number | Country | Date |
|---|---|---|
| 696,593 | France | Jan. 5, 1931 |
| 761,414 | France | Mar. 19, 1924 |